Nov. 6, 1962 C. R. BEHLING 3,062,395
PRODUCT TRAY CONVEYING APPARATUS
Original Filed May 11, 1954 7 Sheets-Sheet 1

INVENTOR
CLARENCE R. BEHLING
BY
ATTORNEYS

Nov. 6, 1962  C. R. BEHLING  3,062,395
PRODUCT TRAY CONVEYING APPARATUS
Original Filed May 11, 1954  7 Sheets-Sheet 2

INVENTOR
CLARENCE R. BEHLING
BY
ATTORNEYS

Nov. 6, 1962   C. R. BEHLING   3,062,395
PRODUCT TRAY CONVEYING APPARATUS
Original Filed May 11, 1954   7 Sheets-Sheet 3
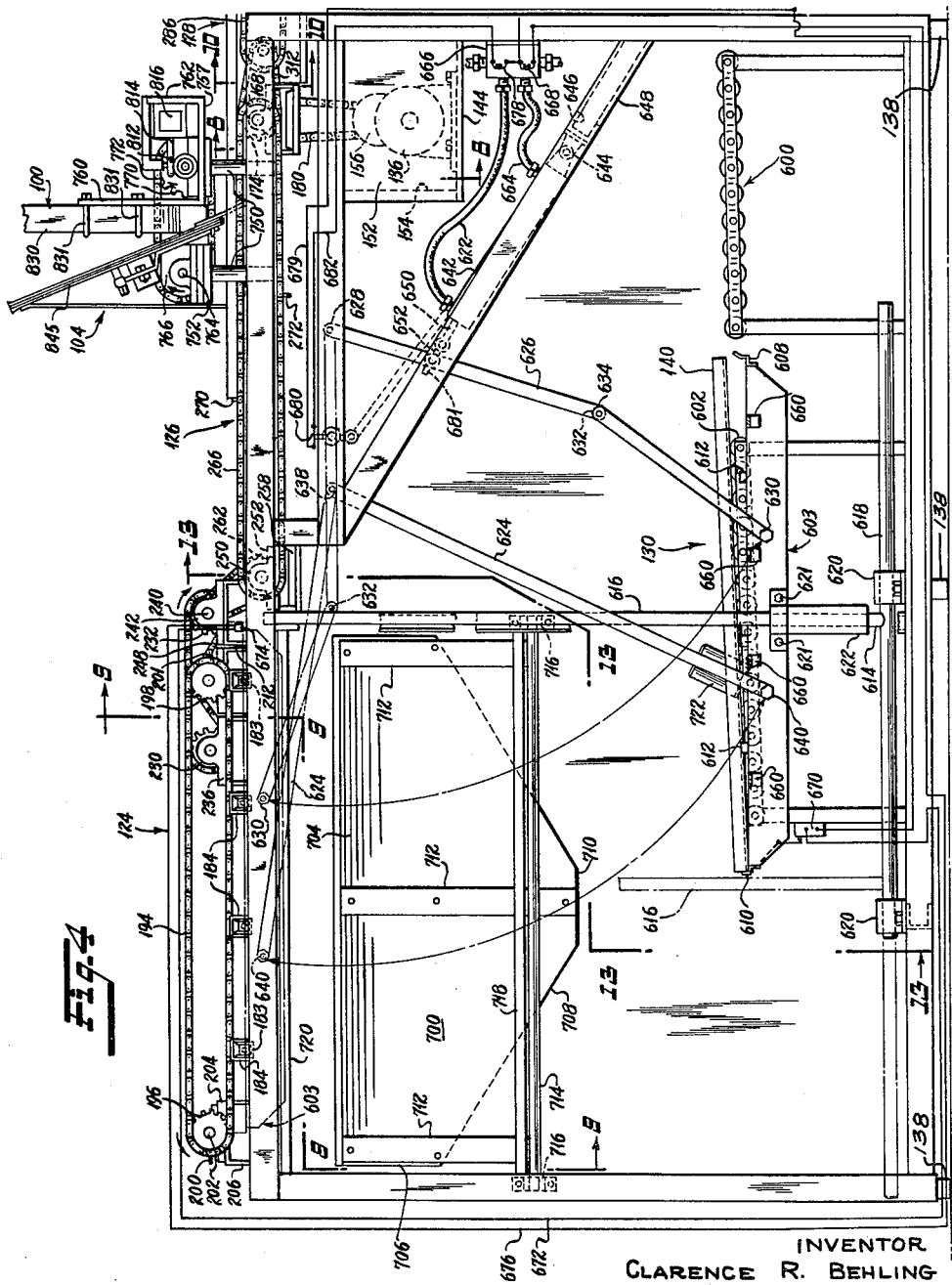
INVENTOR
CLARENCE R. BEHLING
BY
ATTORNEYS Nov. 6, 1962 C. R. BEHLING 3,062,395
PRODUCT TRAY CONVEYING APPARATUS
Original Filed May 11, 1954 7 Sheets-Sheet 4
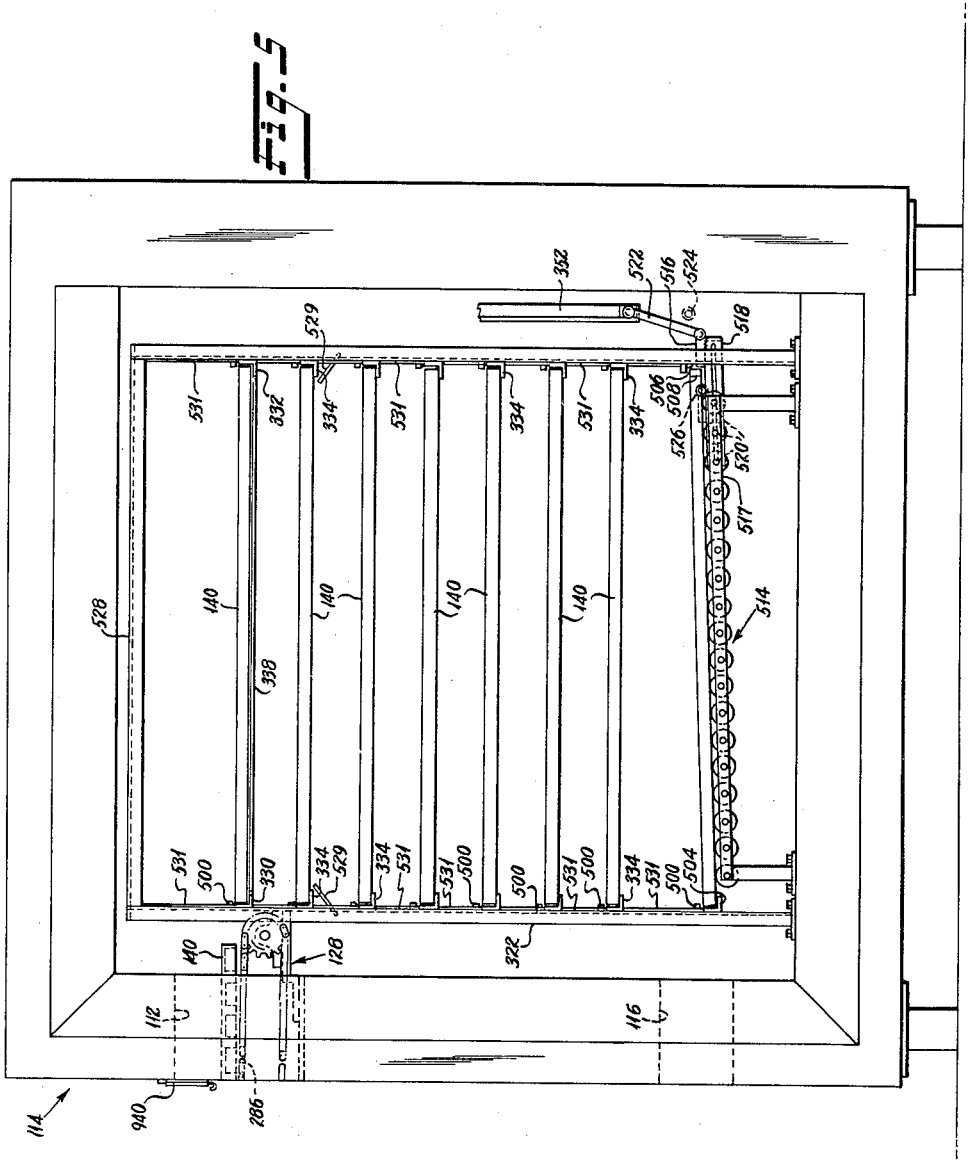
INVENTOR
CLARENCE R. BEHLING
BY *Strauch, Nolan & Neale*
ATTORNEYS Nov. 6, 1962 C. R. BEHLING 3,062,395
PRODUCT TRAY CONVEYING APPARATUS
Original Filed May 11, 1954 7 Sheets-Sheet 5
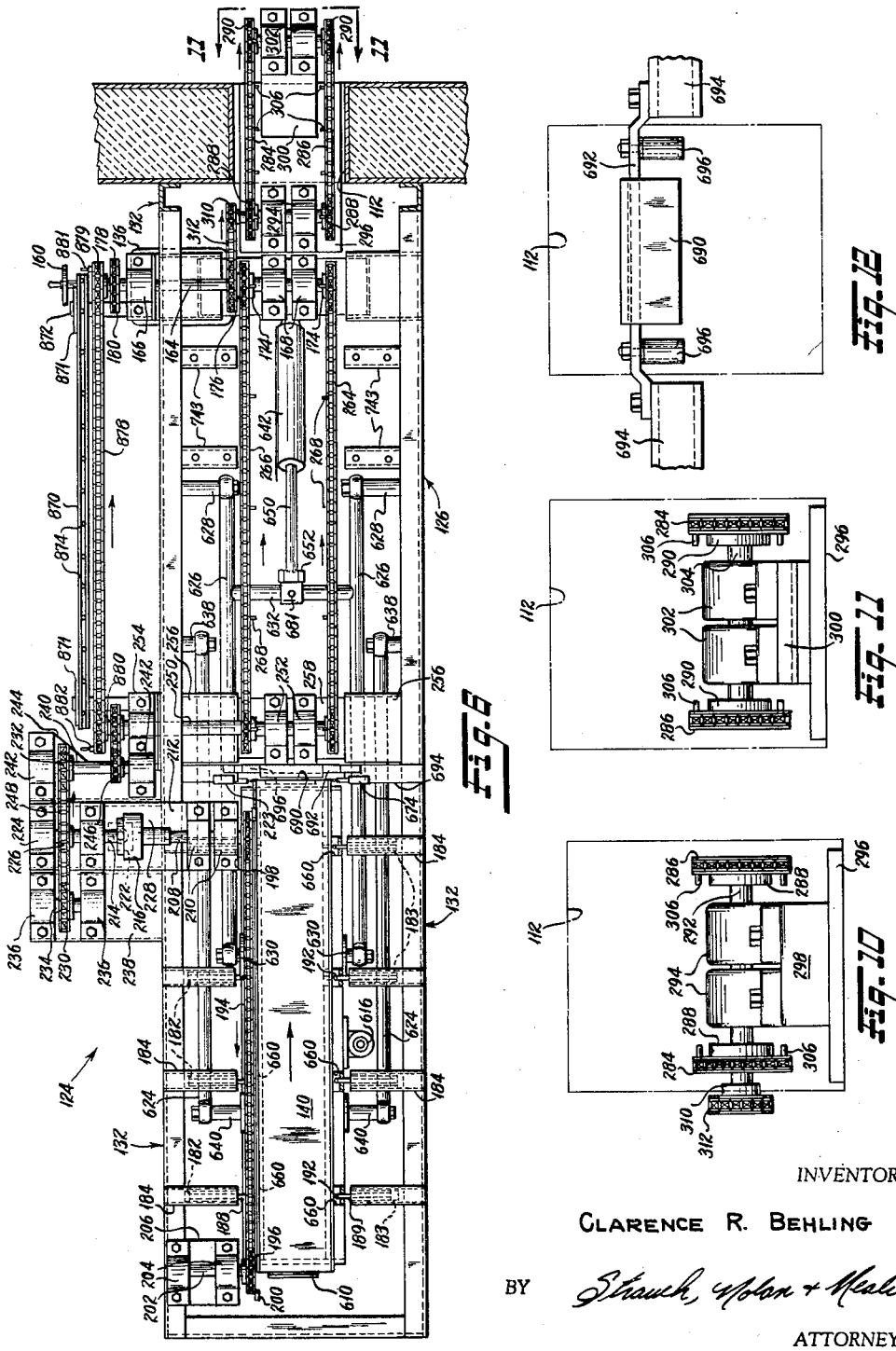
INVENTOR
CLARENCE R. BEHLING
BY
ATTORNEYS Nov. 6, 1962          C. R. BEHLING          3,062,395
PRODUCT TRAY CONVEYING APPARATUS
Original Filed May 11, 1954          7 Sheets-Sheet 6
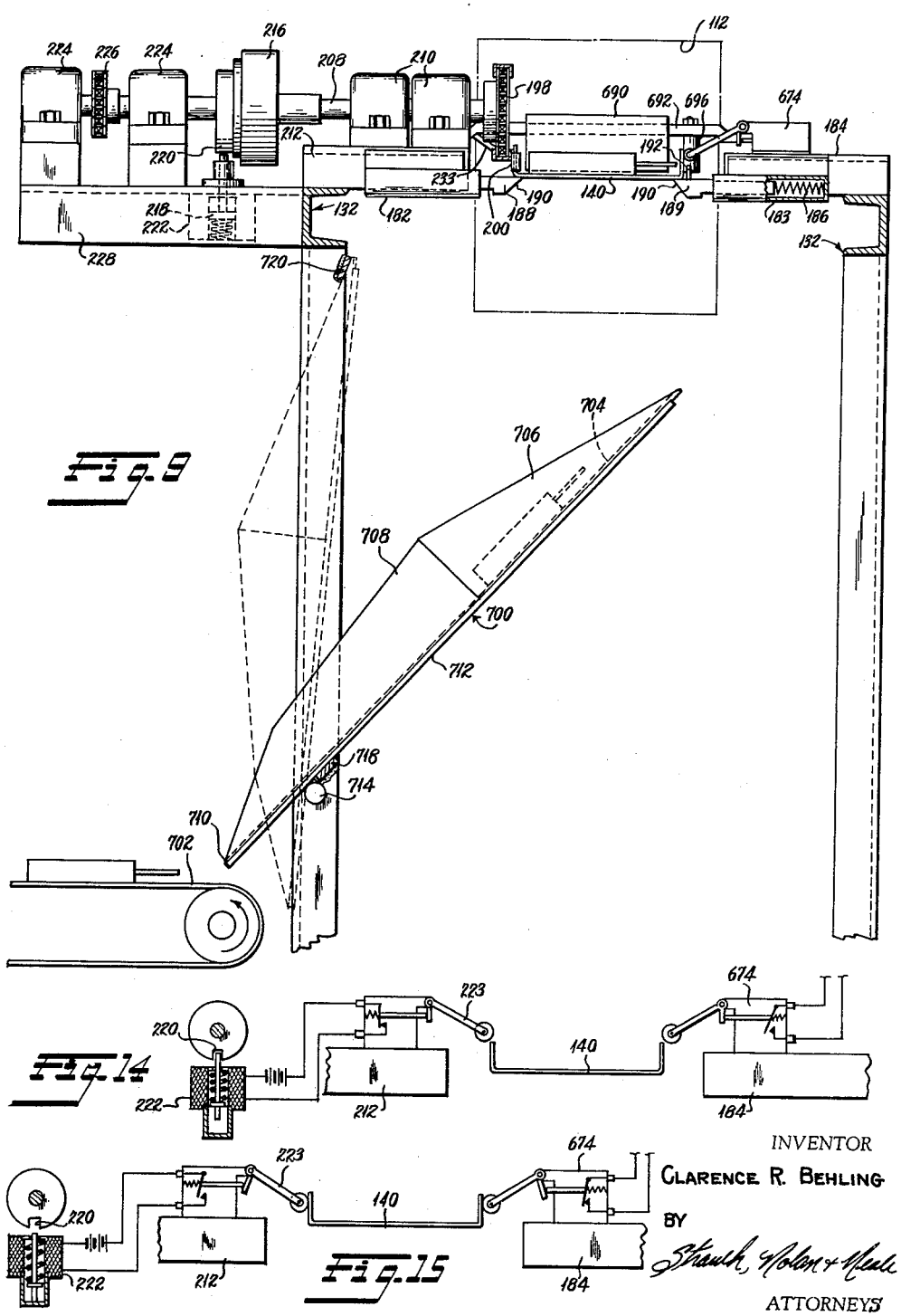
INVENTOR
CLARENCE R. BEHLING
BY
ATTORNEYS

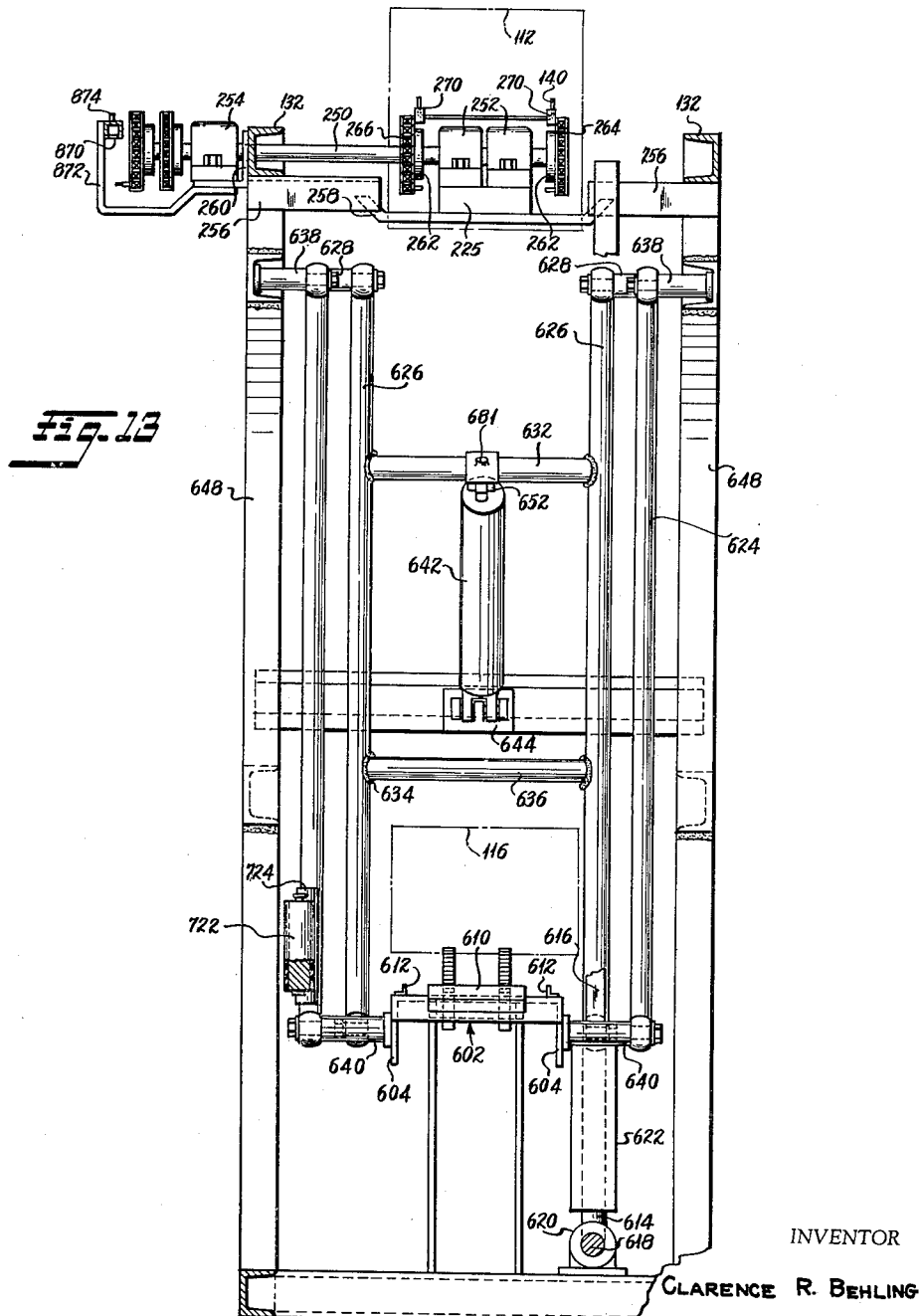

United States Patent Office 3,062,395
Patented Nov. 6, 1962

3,062,395
PRODUCT TRAY CONVEYING APPARATUS
Clarence R. Behling, 3817 E. Green St., Pasadena, Calif.
Original application May 11, 1954, Ser. No. 428,960, now Patent No. 2,903,979, dated Sept. 15, 1959. Divided and this application July 21, 1959, Ser. No. 828,642
7 Claims. (Cl. 214—310)

This invention relates to conveying apparatus for use in product processing and more particularly relates to a combination conveyor system for trays used in making frozen confections from a mass of semi-frozen or plastic confection mix. The invention disclosed and claimed in this application is divided from my copending application Serial No. 428,960 filed May 11, 1954, for Product Processing Apparatus, now Patent No. 2,903,979.

While the apparatus of the present invention is of general application it is contemplated that it will find primary utility in connection with the processing of frozen confections such as ice cream bars and for purposes of disclosure will be so described and illustrated.

This invention is part of an entirely automatic, continuous cycle free tray system wherein the trays remain substantially horizontal throughout a cycle of travel which includes depositing units of unprocessed or semi-processed material at controlled spaced intervals on an elongated tray carried on a relatively slow moving conveyor, transferring the tray to a higher speed conveyor for insertion into a conditioning unit, shifting the tray horizontally and vertically in a predetermined pattern within the conditioning unit to allow the conditioning process to occur, ejecting the full tray with conditioned products onto an elevator conveyor arranged in vertical alignment with the slow conveyor, conveying the full trays still in a horizontal position to an intermittent acting horizontal conveyor which returns the tray to its starting position and simultaneously removes all conditioned units from the tray to a bin or adjacent conveyor system for delivery to a packaging or further conditioning device. The elevator conveyor, a portion of the slow moving conveyor, the equipment for removing products from the trays and the coordinated structural and functional cooperation between these units constitute the invention of this application.

The refrigerated antechamber, enclosing the remainder of the conveying system in the continuous cycle, remains at a temperature below freezing and at a value where presently used lubricants for small moving parts do not freeze. By maintaining a low temperature in the antechamber and leaving the frozen units on the trays until just prior to depositing unprocessed units on the trays, the trays remain at a sub-zero temperature, approximately that of the freezing cabinet. This is of importance because it has been determined that units of semi-frozen products deposited on trays maintained at or below a certain temperature value will not freeze to the tray, thus the invention eliminates the need of mechanisms to knock or jar the products lose from trays after freezing.

The tray used in the present invention may be made of stainless steel and is formed as an elongated trough or U-shaped channel member having open ends. The trays are thus easy to fabricate, easy to clean and lend themselves to the novel unit unloading feature of the present invention where the processed or conditioned units are held stationary while the tray passes out from under them, or, relatively speaking, the units slide off the open end of the tray into a conveyor chute to be delivered elsewhere as desired.

Throughout the entire automatic cycle the trays rest on conveyor support surfaces and are not attached in any manner to the conveyors.

The system rate is controlled by the speed of the chain conveyors. The indexing chain conveyor moves the tray below the cutting and depositing mechanism where the extruded products are cut into desired portions and deposited in predetermined spacings along the length of the tray as determined by a cutter indexing device cooperating with the indexing conveyor. The intermittent chain conveyor, meanwhile moves another tray onto the indexing conveyor behind the tray being filled. As the last cut portion is deposited on the tray, the tray engages the accelerating conveyor which inserts the tray lengthwise into the freezing cabinet at one end of the upper level of horizontal tracks. As the tray slides into position on the track it engages a limit-switch to initiate the horizontal shift of all trays within the cabinet. By proper limit switch interconnection the alternate end trays are lowered one level and the bottom end tray is ejected onto the elevator conveyor where, by further limit switch cooperation, the elevator raises the tray through a novel system of snap latches to the intermittent chain conveyor. By still further limit switch action the elevator lowers into position for receiving the next ejected tray from the freezer cabinet while the intermittent conveyor starts the tray toward the indexing conveyor simultaneously passing the tray under the previously mentioned unloader completing a wholly automatic continuous cycle. By merely increasing or decreasing the chain conveyor drive speed the rate of the entire cylcle of the automatic system is increased or decreased. Excepting as applicable to the present invention, the controls and associate power mechanisms for the various conveyors will not be herein described. If deemed necessary, reference may be made to aforementioned Patent No. 2,903,979 wherein the entire system is completely described.

As will be apparent hereinafter, the rate of operation of the chainless magazine tray conveyor required to receive a tray of unconditioned units and eject a tray of conditioned units will be a constant value determined by the time required for the hydraulic mechanism to perform the shifting operations. This rate is sufficient to correlate with maximum input of unconditioned products to the machine.

It will thus be realized that this invention, by its novel structure and control mechanism, has overcome many problems associated with mass producing frozen products. As is pointed out, this machine by eliminating lengthy chains and sources of freezing in conveyor mechanisms, decreases possibility of potential breakdowns; by its simple free tray mechanism, sanitation problems are alleviated; by its compact arrangement space problems are overcome; and by the novel control system, long lengths of movable mechanisms are eliminated and a positive, dependable relatively simple complete cycle control is obtained.

With these and other considerations in view, it is an important object of this invention to provide a novel reliable compact multi-conveyor free tray product conditioning machine.

A still further object is to provide a novel system of inter-related conveyors cooperating to result in an automatic free tray conveyor.

Another object resides in the provision of novel electrical, hydraulic, mechanical controls cooperating with free tray conveyors to produce a novel conveyor machine.

A still further object resides in the novel provision of an upper level track and chain horizontal conveyor cooperating with a lower level vertical conveyor so that the lower level conveyor can raise a tray to the upper level and deposit it on the upper level conveyor.

A still further object resides in the novel automatic control system whereby a lower level conveyor can raise a horizontal tray to an upper level and deposit it on a horizontal conveyor to initiate operation of the horizontal conveyor and return the lower level conveyor to its lower position, each time a tray is placed on the lower level conveyor.

A still further object resides in a novel vertical shifting conveyor for free horizontally disposed trays.

A still further object resides in a vertical shifting conveyor, for free horizontally disposed trays, combined with an automatic control system actuated by a tray to lock out operation of the conveyor or raise the conveyor to an upper level position and actuated by the conveyor upon reaching the upper level to lower the conveyor to its original position.

A still further object resides in a novel mechanism wherein channel shaped trays are conveyed past a depending finger unloading member that fits within the tray, coacts with and retards movement of products carried by the tray and permits the tray to continue from under the products whereupon the products fall through the conveyor to a chute below the conveyor.

A still further object resides in a novel conveyor machine for free trays where a vertical conveyor raises a tray in a horizontal position between horizontal tracks of a horizontal conveyor having latch means cooperating with the tray to retain the tray upon downward movement of the vertical conveyor.

Further objects and advantages of the invention will be apparent from the following description in conjunction with the accompanying drawings wherein the preferred embodiment is set forth in detail and from the appended claims which are to be accorded a range of equivalents consistent with the state of the prior art.

The preferred embodiment of the invention herein disclosed is illustrated in the following drawings in which:

FIGURE 4 illustrates the components of the present invention, being a right side elevation of the three chain conveyors, elevator conveyor, the depositing mechanism and the unloading mechanism with the antechamber covers removed;

FIGURE 5 is a right hand elevation of the sub-zero freezer cabinet with the access door removed and forms a continuation from the right side of FIGURE 4;

FIGURE 6 is a top plan view of the chain conveyors and elevator mechanism shown in FIGURES 4 and 5 with the antechamber cover and depositing mechanism removed, and with the elevator in a raised position;

FIGURE 7 is a perspective view of a typical product tray;

FIGURE 9 is an enlarged vertical section taken on lines 9—9 of FIGURE 4 showing the tilting chute and a section through the intermittent conveyor;

FIGURES 10 and 11 are enlarged vertical sections taken on lines 10—10 and 11—11 respectively of FIGURES 4 and 6 respectively, showing various details of the accelerating conveyor;

FIGURE 12 is an enlarged detail elevation view of the tray unloading bar;

FIGURE 13 is an enlarged vertical section taken on lines 13—13 of FIGURE 4 showing details of the indexing conveyor system;

FIGURE 14 is a schematic view of the wiring circuit for the intermittent conveyor slip clutch solenoid in the inoperative condition; and FIGURE 15 is a view similar to FIGURE 14 showing the circuit in the tray operated condition.

*General Description*

In a product processing machine of the preferred and illustrated type, a product in semi-solid or plastic state is extruded through a conveying tube to a point above a tray conveyor. A plurality of elongated trays are successively conveyed lengthwise by several adjacent conveyors past the nozzle of the extruding tube. As the trays pass under the nozzle the extruded product is cut and deposited therein. The trays continue in a lengthwise direction to a sub-zero freezing room or cabinet to harden the products units for subsequent handling and storage. From the freezing room the trays are successively, automatically ejected to another conveyor which returns the filled trays to the first mentioned conveyors, ready to repeat the cycle. As the trays again start through the cycle the hardened frozen products are unloaded into an adjoining chute which deposits them on an adjacent belt conveyor. The belt conveyor may carry the products to further processing machines for coating, wrapping, packing or storage.

Figures 1, 2:
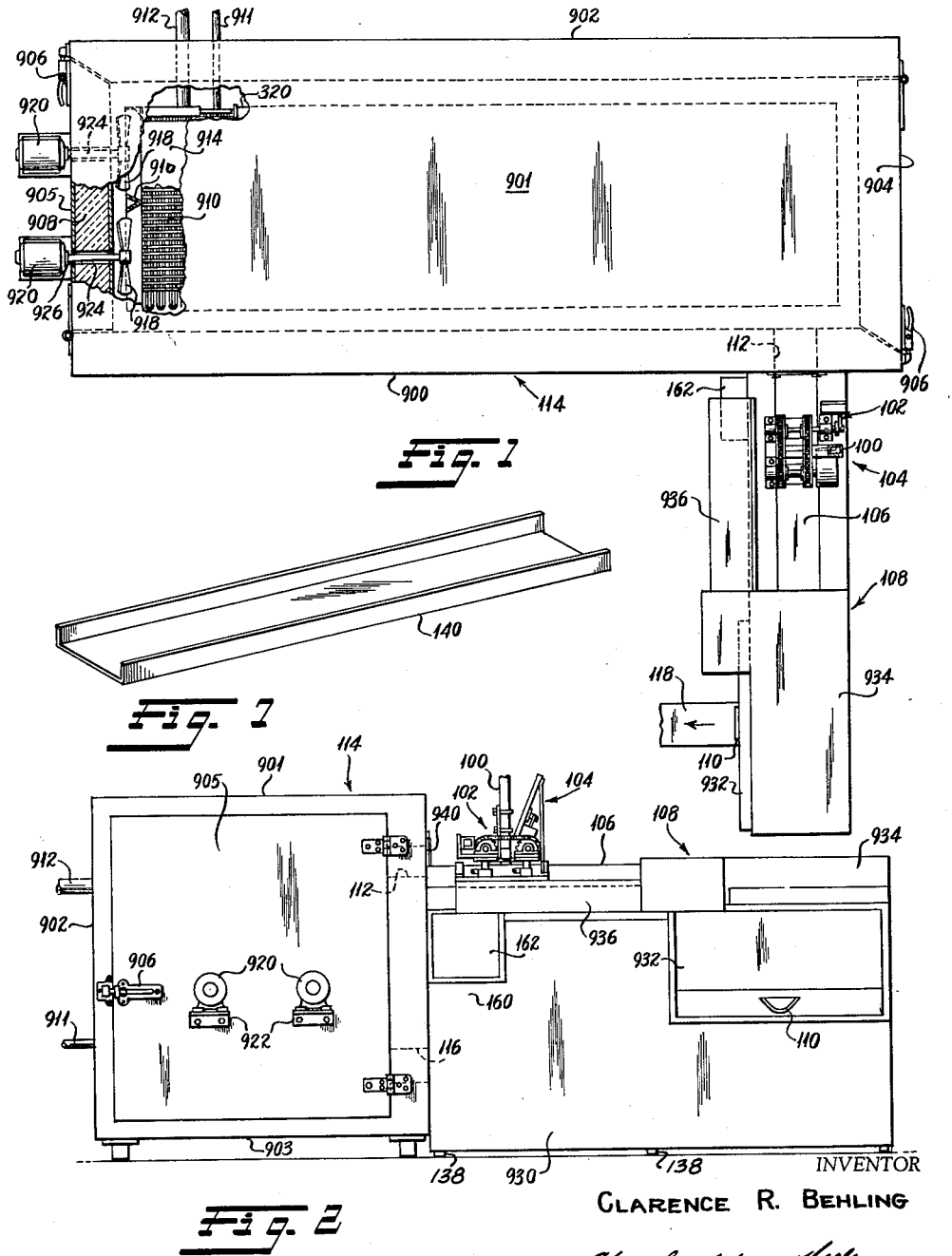
FIGURE 1 is a partially broken top plan view of the entire machine.
FIGURE 2 is a side elevation as viewed from the left side of FIGURE 1.
Figure 3:
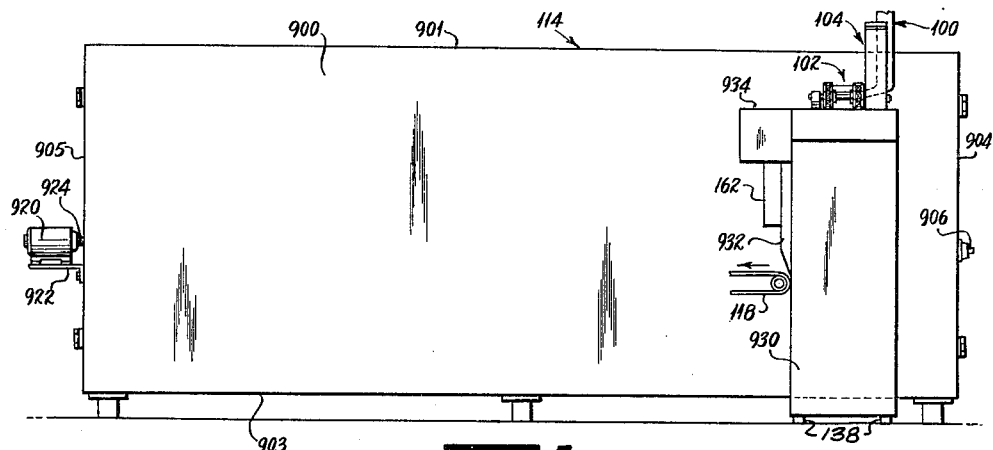
FIGURE 3 is a front elevation of the machine.

Referring now to the drawings and in particular to FIGURES 1, 2 and 3, the semi-solid or plastic product to be processed or conditioned is piped to the machine through tube 100 into cooperating arrangement with the cutting mechanism, generally indicated at 102, and the stick inserter generally indicated at 104. By mechanism and a control system which is fully described in the aforementioned parent application, now Patent No. 2,903,979 the product being extruded from the tube is cut and a stick simultaneously inserted. The resulting unit of product drops through a small opening in the upper surface of a Plexiglas cover 106 and is deposited on a moving tray. FIGURES 1, 2 and 3, with the exception of a portion of FIGURE 1 which shows a partially broken section of the cooling end of the sub-zero freezing cabinet, show only the exterior of the machine. Reference character 108 indicates the antechamber, which, except for the small opening in the Plexiglas cover 106 and the product exit chute opening 110, entirely encloses three aligned chain type conveyors and one vertical elevator conveyor. The antechamber conveyors are arranged in line to pass a tray longitudinally under the cutting mechanism and through an opening 112 adjacent the upper edge of the front wall of a sub-zero freezing cabinet generally indicated at 114.

Within the sub-zero freezing cabinet the trays enter a chainless tray magazine conveyor and are passed horizontally and vertically in a predetermined pattern, to be explained more fully hereinafter, until the products carried by the trays are completely frozen. At this point the trays are ejected through a front wall exit opening 116 vertically disposed below entrance opening 112. The ejected tray is received by the vertical conveyor, normally positioned in the lower portion of antechamber 108, which raises the loaded tray to and deposits it on the aligned conveyors adjacent the top of antechamber 108. At this point the tray is again conveyed toward the opening 112 and during this travel the conditioned or processed products are unloaded and exit out of chute opening 110 to be deposited on a conveyor belt 118 and carried to further machines, manual handling or cold storage.

In FIGURE 4, the four conveyors enclosed in antechamber 108 are disclosed in elevation and will be referred to as the intermittent conveyor 124, the indexing conveyor 126, the accelerating conveyor 128 and the elevator conveyor 130. These conveyors are mounted on a suitable structural antechamber frame formed of channel iron generally indicated at 132. Frame 132, in addition to supporting the four conveyor systems has suitably mounted thereon, as by depending bracket means 134, a variable speed drive motor 136. Motor 136 operates chain conveyors 124, 126 and 128 by means to be presently described. If desired, leg members 138 (see FIGURES 2, 3 and 4) may be added to frame 132 as suitable supports.

The preferred type of product tray 140 is best illustrated in FIGURE 7 and comprises an open-ended, elongated, shallow U-shaped tray. The tray may be made of various materials, as desired. One embodiment utilizes 16 gauge stainless steel. Another embodiment (not shown) consists of a woven stainless steel wire basket formed with the same trough shaped open-ended form disclosed in FIGURE 7. The length, depth and width of the trays will be determined by the structural design of the chainless tray magazine conveyor, generally indicated as 142 in FIGURE 5 wherein the trays are shown as resting on tracks on front and rear walls of the magazine conveyor. The magazine structure will be explained in full detail hereinafter.

*Variable Speed Drive*

Figure 8:
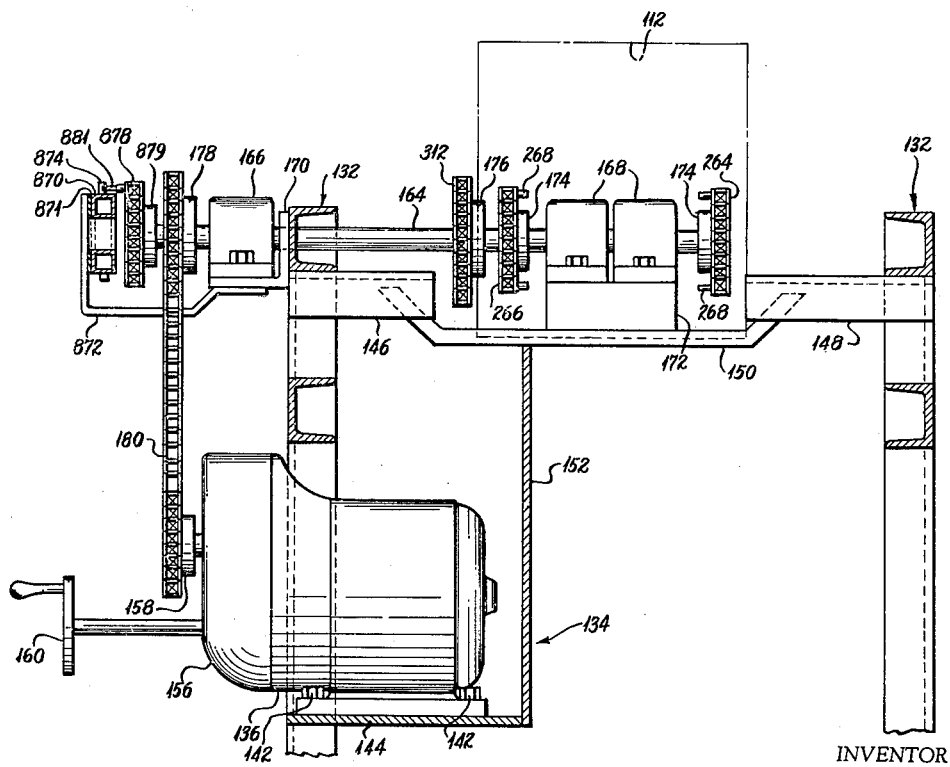
FIGURE 8 is an enlarged vertical section taken on lines 8—8 of FIGURE 4 showing the variable speed drive and main conveyor drive shaft.

With reference to FIGURE 4 and FIGURE 8, the variable speed drive motor 136 is supported by depending bracket means generally indicated at 134. Motor 136 is suitably fastened, as by bolts 142, to a horizontal platform 144. Short lengths of wide channel iron 146 and 148 are fastened by any suitable means, such as welding, riveting or bolting, to frame structure 132. A bent support plate 150 is fastened to channel members 146 and 148, as by welding, to form a horizontal platform for a purpose to be described later. Depending from support plate 150 is vertical plate 152 joined to horizontal platform 144 by welding or bolting. As may be seen in FIGURE 4, plate 144 is suitably fastened at one side to a vertical frame member and at the other side by depending plate members 152 and 154. Drive motor 136 is thus rigidly mounted to the supporting frame structure 132. Plates 144, 152, 154 and another plate, not shown, partition the drive motor from the interior of the antechamber cabinet. The motor enclosure is completed by a removable cover 162, FIGURE 2, fastened by suitable latch means to the antechamber casing or cover.

A variable speed mechanism 156 is fastened to the motor casing. Extending from the side of variable speed mechanism 156 are a drive shaft, carrying sprocket member 158, and a manual control means 160 for varying the output speed of the variable speed mechanism 156. Vertically disposed above the motor 136 and parallel with the axis of sprocket 158, a main drive shaft 164 is suitably journalled in three ball bearing pillow blocks 166 and 168. Pillow bearing 166 is bolted to a small section of angle iron 170 fastened to frame work 132. Pillow bearings 168 are bolted to a support block 172 fastened to bent plate 150. Although not detailed, all pillow block bearings are adjustably mounted to properly locate the shaft and thereby keep the chains taut and in proper relation to each other.

Suitably spaced on and keyed to shaft 164 are indexing conveyor chain sprockets 174, and an interconnecting drive sprocket 176. Immediately above and in the same plane with sprocket 158 a fourth sprocket 178 is suitably keyed to drive shaft 164. An endless roller link chain 180 passes over and around sprockets 158 and 178 to form a drive connection between the variable speed drive and the main drive shaft 164.

Thus it will be appreciated that by controlling the variable speed mechanism 156, the main drive shaft 164 and all driven members deriving their driving power from the main drive shaft can be adjusted to a desired operating speed. Main drive shaft 164, as will become apparent, through interconnecting chain links, constitutes the drive for all three of the chain conveyors 124, 126 and 128, which will now be described in detail.

*Intermittent Conveyor*

In the intermittent chain conveyor the tray rests on supporting structure and a chain engages with, forms driving means for and provides lateral guide for the tray. With reference to FIGURES 4 and 9, the intermittent conveyor track provided for tray 140 comprises a plurality of opposed pairs of spring loaded barrel bolt latches 182 and 183 suitably fastened as by bolts, welding or riveting to short lengths of channel iron 184 horizontally projecting from the frame work 132 and suitably fastened thereto. Each of the opposed latches 182 and 183, FIGURE 9, comprises a body portion fastened within a channel member 184 enclosing a biasing spring 186 engaging and biasing a latch plunger 188 or 189 to an extended position. Lower surfaces 190 of plunger 188 and 189 are beveled to enable a tray, lifted from below the level of latch plungers 188 and 189, to coact against the beveled edges 190 and move latch plungers 188 and 189 against the biasing action of springs 186, and to continue to move vertically past the latch plungers. When the trays reach a position above the latch plungers, biasing springs 186 force plungers 188 and 189 back to their extended position. Tray 140 may then rest on the upper surfaces of the ends of latch plungers 188 and 189, as the lifting mechanism retracts to the lower position. Four pairs of the opposed latches are spaced along the length of the intermittent chain conveyor 124 and constitute lower support members of the conveyor guide track. Latch plungers 189, along the side of the conveyor track opposite the drive chain, are provided with vertically extending lugs 192 on their upper surfaces to act as lateral guides along that side of the tray track.

To positively convey the tray 140 in the directions of the arrow, FIGURE 6, a vertically planar roller link chain and sprocket arrangement is provided parallel to and slightly laterally off-set from the side of the tray track opposite latches 189. The chain drive comprises a roller link chain 194 which passes over and around sprocket wheels 196 and 198. The chains and sprockets are so arranged that the lower stretch of chain (FIGURE 9) acts as a lateral track guide means opposite the latch lugs 192. Disposed on the side of chain 194 facing the tray track are two indexing drive lugs 200 and 201 shown in FIGURES 4 and 6 in their intermittent stop and start positions. FIGURE 9 shows lug 200 driving a tray 140. In this position the lugs 200 and 201 are out of the way of any tray to be vertically lifted between and deposited on the tracks. As indicated in FIGURE 4 the intermittent drive chain 194 is rotated in the counterclockwise direction. Rotation of chain 194 occurs only when a tray has been placed in the conveyor tracks, rotation being controlled by mechanism to be described hereinafter. When chain 194 rotates, a lug 200 on the chain, passes around wheel 196, engages the end of a tray 140 and forces the tray to the right. The chains are designed so the linear length of chain between lugs 200 and 201 is equal to the length of a tray. As a tray reaches the end of the intermittent conveyor track and the drive lug 200 or 201 starts around wheel 198 and disengages from the tray, rotation of the intermittent conveyor ceases, as will be explained. Note that only a small side margin of the base of the trays contacts the support lugs 188 and 189.

Sprocket wheel 196 is suitably keyed on a shaft 202 journalled in pillow block bearings 204 bolted to a support channel 206 which is riveted, welded or bolted to frame 132. Sprocket wheel 198 is suitably keyed to drive shaft 208 journalled in pillow block bearings 210 bolted to a support channel 212 suitably fixed to frame members 132. The intermittent conveyor drive shaft 208 is connected to a drive shaft 214 by an intermittent acting drive slip clutch 216 which is prevented from rotating by a spring loaded solenoid plunger 218 engaging a notch 220 formed on the exterior circumference of clutch 216. Whenever a tray is deposited on latches 188 and 189, a solenoid 222 is actuated to withdraw plunger 218 from notch 220 and allow the drive shaft 214 to drive through slip clutch 216 and rotate the conveyor chain 194. Control for this solenoid is by a limit switch 223, described with the elevated conveyor control hereinafter. The drive slip clutch is adjusted to slip when a tray being conveyed abuts the next tray on the indexing conveyor.

Drive shaft 214 is journalled in two pillow block bearings 224 bracketing a sprocket wheel 226 suitably keyed to the shaft 214. The pillow blocks are bolted to a support channel 228 extending horizontally from framework 132. Support channel 228 also forms a support for solenoid 222.

As is apparent in FIGURE 4, the intermittent conveyor chain contacts the trays as the chain traverses the lower stretch of its loop, whereas the other two aligned conveyors contact the trays as the chains traverse the upper stretch of the loops. For this reason, drive shaft 214 and the intermittent conveyor chain rotate opposite to the other two conveyor chains, therefore a reversing drive connection is provided between sprocket wheel 226 and the main drive system. The reversing drive consists of two sprocket wheels 230 and 232 in the same plane as sprocket wheel 226, spaced on either side thereof and respectively keyed to shafts 234 and 240. Shafts 234 and 240 are journalled respectively in the pillow block bearings 236, 242 bolted to support plates 238 and 244 suitably affixed to frame member 132. Shaft 240 also has a sprocket wheel 246 keyed thereto and driven from the main drive system by means described later. It is noted that sprocket wheels 246, 230 and 232 rotate in a clockwise direction as seen in FIGURE 4. To enable sprocket wheels 230 and 232 to drive sprocket wheel 226 in a counterclockwise direction a roller link chain 248 is provided which passes around and engages with sprocket wheels 230 and 232, and has its lower stretch passing over and engaging sprocket wheel 226. The diameter of sprocket wheel 226 is less than that of sprocket wheels 230 and 232, resulting in an increased speed between the drive means and conveyor chain 194 for reasons to become apparent.

*Indexing Chain Conveyor*

As the tray 140 is conveyed to the right by the intermittent conveyor, as viewed in FIGURE 4 and FIGURE 6, it passes to the indexing conveyor 126, a chain type conveyor that supports and conveys a tray by the top stretches of chains. As previously noted, main drive shaft 164 is journalled in pillow block bearings 168 adjacent one end of the conveyor frame work 132. Sprocket wheels 174 constitute the chain guide and drive means at one end of the indexing chain conveyor. At the end of the indexing chain conveyor which is adjacent the intermittent conveyor 124, a shaft or axle 250 is journalled in pillow block bearings 252 and pillow block bearing 254. Bearings 252 are bolted to a support block 255 which is fastened by channel irons 256 and bent support plate 258 in a manner similar to that supporting bearings 168. Bearing 254 is bolted to an angle iron 260 suitably fastened to frame 132. On either side of bearings 252, sprocket wheels 262, the same diameter as sprocket wheels 174, are keyed to shaft 250. Sprocket wheels 262 and 174 are so positioned on their respective shaft that an endless chain carried by each set of sprocket wheels will be spaced apart a distance slightly greater than the width of one tray. Endless roller link chains 264 and 266 pass around and engage with sprocket wheels 262 and 174 to thus provide two vertically disposed parallel horizontally spaced endless chain loops. At spaced intervals on the facing link surfaces of the parallel chain loops a plurality of horizontally disposed support pins 268 are integrally fastened. Pins 268 are arranged in opposed pairs and two of the pairs, which are equidistantly spaced about the loops chains 264 and 266, include transverse driving lugs indicated at 270 and 272. The pairs of opposed drive lugs 270 and 272 alternately engage the ends of successive trays 140 which will rest on horizontal support pins 268. This is best seen in FIGURES 4 and 13 which disclose the drive lugs 270 engaging the end of a tray 140. As in the intermittent conveyor, the linear length of chain between drive lugs 270 is equal to the length of a tray.

The plane of the upper surfaces of latch plungers 188, FIGURE 4, is tangent to the tops of horizontal support pins 268 on the upper stretches of chains 264 and 266, consequently a tray passing from the intermittent conveyor to the indexing conveyor remains in the same horizontal plane.

One end of shaft 250 passes through and extends beyond bearing 254, has a sprocket wheel 274 keyed thereto and located in the same vertical plane as previously mentioned sprocket wheel 246. An endless chain 276 passes around and engages with both of sprocket wheels 246 and 274. It is to be noted that sprocket wheel 246 is of smaller diameter than sprocket wheel 274. Thus shaft 250, rotating at the indexing conveyor speed connects through large sprocket wheel 274 and chain 276 to small sprocket wheel 246, driving shaft 240 at a higher rate of speed than shaft 250. A further speed increase is realized, as before mentioned, between sprocket wheel 232 and sprocket wheel 226 which drives the intermittent chain loop 194. It is thus apparent that intermittent drive chain 194 operates at a much higher speed than the indexing conveyor chains 264 and 266 preferably a 2:1 ratio. This feature assures that the tray moving from the intermittent conveyor, and following a tray on the indexing conveyor will move to a position adjacent and abutting the drive lugs 270 or 272 that are driving the preceding tray, consequently no gap exists between trays on the indexing conveyor as adjacent ends of two trays pass under the depositing mechanism. At the point where the tray being transferred from the intermittent conveyor to the indexing conveyor abuts the drive lugs 270 or 272, the intermittent drive chain 194 can no longer shift the tray at a higher speed than permitted by the indexing conveyor chain, and therefore the slip clutch 216 will enable shaft 214 to overrun shaft 208.

Connected to shafts 164 and 250 and cooperating therebetween, there is an indexing means or mechanism, generally indicated at 280, which is described in further detail in aforenoted Patent No. 2,903,979. The indexing means is mentioned at this point to note that the indexing conveyor which is driven at a constant predetermined speed, is directly connected to the indexing means, which controls the depositing mechanism in accord with the position of the tray on the indexing conveyor. The indexing conveyor is so called because of this relationship.

As the indexing conveyor carries a tray along its path of travel, the tray passes beneath a product unit depositing mechanism comprising, in the disclosed embodiment, the extrusion tube 100, cutting mechanism 102 and stick inserter 104 positioned above and intermediate the ends of the indexing conveyor. The depositing mechanism is actuated intermittently by the aforementioned indexing means to fill the tray, as it is conveyed beneath the depositing mechanism, with units of the product to be processed. When the tray is filled it passes from the indexing conveyor to an aligned accelerating conveyor 128 which carries the loaded tray into the freezing cabinet 114 at an accelerated rate of speed to create a gap between the loaded tray and the succeeding tray being filled. This gap is necessary to permit the magazine conveyor to operate one complete cycle before the succeeding tray starts entry into the magazine conveyor.

*Accelerating Conveyor*

The accelerating conveyor 128 is positioned adjacent the discharge end of the indexing conveyor 126 and is vertically aligned therewith to transfer a tray filled with product units from the indexing conveyor to the chainless tray magazine conveyor 142. Accelerating conveyor 128 passes through entrance 112 of a side wall of the sub-zero freezing cabinet 114. This may be seen by joining FIGURES 4 and 5 and is also shown in FIGURE 6. FIGURES 10 and 11 are end views of the accelerating conveyor.

Accelerating conveyor 128 has parallel vertically arranged endless chains similar to those of the indexing conveyor. Two roller link type endless chains 284 and 286 pass around and engage with sprockets 288 and 290, each chain and its corresponding pair of sprocket wheels being arranged in vertical planes coincident with the planes of indexing conveyor chains 264 and 266. Paired sprocket wheels 288 are keyed to a driven shaft 292 journalled in pillow block bearings 294. A base plate 296 is fastened by suitable means either to framework 132 or to the cabinet wall and extends horizontally into cabinet entrance 112. Suitably affixed to the antechamber end of base plate 296 is a support block 298 having pillow block bearings 294 bolted thereon. At the opposite end of base plate 296, within the freezer cabinet, a bent bracket member 300 is bolted through longitudinal slots in the end of base plate 296 to enable adjustment of tension on the accelerator conveyor chains. Sprocket wheels 290 are keyed to the ends of a shaft 304 journalled in pillow block bearings 302 suitably affixed to the adjustable bracket 300. It will be apparent from FIGURE 4 that shafts 292 and 304 are parallel and horizontally disposed, however, shaft 304 is at a lower elevation than shaft 292, consequently chain tracks 284 and 286 have a downward inclination.

The depositing mechanism is so arranged in relation to the indexing conveyor to complete the filling of a tray carried by the indexing conveyor just before the center of gravity of the filled tray passes top dead center of sprocket wheels 174. As the tray passes out from under the depositing nozzle, and its center of gravity passes top dead center of sprocket 174, the tray will tilt downwardly to rest on horizontally disposed pins 306 projecting from the inner faces of the accelerator conveyor chains 284 and 286.

Shaft 292 has an extended end portion to which is affixed a sprocket wheel 310 arranged in a vertical plane coextensive with sprocket wheel 176 on main drive shaft 164. Sprocket wheels 176 and 310 are interconnected by an endless link chain 312 whereby the accelerating conveyor is directly connected to the main drive shaft 164 and will rotate or be in operation whenever the indexing conveyor is operating. To enable the accelerating conveyor 128 to operate at a higher speed than the indexing conveyor, sprocket 310 is constructed with one-half as many teeth as sprocket 176, resulting in a 2:1 speed ratio between the accelerating conveyor and the indexing conveyor.

As previously mentioned, plate 296 may be fastened directly to the cabinet wall or to the frame structure of the antechamber. By fastening the plate to frame structure 132, the accelerating conveyor and the indexing conveyor may be predeterminedly aligned and fixed in that position, thus enabling the antechamber unit containing the fixed conveyors to be removed from a position adjacent the sub-zero freezing cabinet for use with another freezing cabinet or freezing room. Alternatively, should the plate 292 be fastened to the cabinet or freezing wall, it would be a simple matter to disconnect chain 312 for removal of the antechamber unit. Alignment upon reassembly could be very easily maintained through guide blocks 314 bolted to the sides to the cabinet or room wall to guide the ends of frame members 132 in proper abutting relationship to the wall.

The end of the bent support bracket 300 is positioned adjacent an upper corner of the chainless magazine conveyor 142 so the top stretch of accelerating conveyor chain tracks 284 and 286 will be substantially coextensive with the bottom edge of the chainless magazine conveyor entrance 112.

*Tray Magazine Chainless Conveyor*

Within a sub-zero freezing cabinet or room 114, as indicated in FIGURE 1, a magazine type chainless tray conveyor 320 is arranged to receive a filled tray from the accelerating conveyor 128. The magazine conveyor is constructed from channel and angle beams to form a box-like structure having open ends. Referring to FIGURE 5, vertically arranged channel members such as 322, constitute the vertical supporting structure along the front of the magazine. Similar members are situated along the back side of the magazine and correspond to the front vertical channels. Extending horizontally between vertical supports is an angle member 330 having one flange arranged vertically and suitably fastened to each vertical support, the other flange projecting horizontally inward to provide a horizontally disposed track. Opposite and parallel to angle member 330 is a similar angle member 332, fastened along the inner sides of the corresponding rear vertical supports. The horizontal flange of angle members 330 and 332 constitute a pair of top level tracks for supporting a plurality of free trays 140 in side by side relation. Disposed at equally spaced distances below the top level set of tracks are six pairs of angle members 334 disposed horizontally and parallel with track members 330 and 332 on the front and rear vertical support members.

The construction and operation of this chainless magazine tray conveyor is not part of the invention claimed herein and accordingly is but briefly described. Trays are introduced into the top level of tracks passed sideways, lowered, reversed to pass back along the next level of tracks, lowered and reversed. This is repeated until the lower level of tracks is reached.

The lower level of tracks comprises angle track 504 along the front of the magazine and angle track 506 along the back wall of the magazine. These tracks and their stabilizing bars 500 are similar to the tracks at the other levels except the front angle member 504 slants downwardly from left to right to gradually tilt the trays from the rear wall downwardly toward the front wall as they progress from left to right. At the right hand end of the lower level, the rear track 506 extends to the end of the magazine. A stop block 508 is suitably fastened as by bolts to the end of track 506. Front track 504 ends adjacent vertical magazine support channel 323. A short angle extension 510 carrying a stop block 512 is fastened to vertical magazine support channel 322 opposite the end of track 504.

Extending from the right hand end of track 506 at the rear side of the magazine to a position adjacent the end of track 504 at the front wall of the magazine is an inclined skate conveyor 514 arranged to receive a tray as it is pushed off the end of front track 504 and along the back track 506. Stops 508 and 510 serve to properly align a tray 140 as it slides sideways onto skate conveyor 514. When a tray is deposited on the skate conveyor 514 it has completed movement back and forth on all levels of the magazine and is ready to be ejected. In position on the inclined skate conveyor 514 a filled tray will have a tendency to roll down the inclined plane however provision has been made to positively eject the tray out of the magazine exit in a longitudinal direction. In FIGURE 5, a ram member 516 is disclosed as being guidingly supported along the inclined side braces 517 of the skate conveyor 514 by coaction between slotted member 518 along axles 520. Ram 516 is actuated by a downward vertical shift of the rear corner vertical carriage frame 352 and is connected thereto by pivoted link 522. Phantom pivot points 524 and 526 illustrate the positions of the ram 516 and its pivoted link after a downward shift of the rear vertical carriage frame 352.

When all levels of tracks in the magazine are filled with trays the right hand end tray of the lower level of tracks is ejected from the exit in a longitudinal direction by ram 516 when the vertical carriages are lowered.

When a tray is ejected along skate conveyor 514 it passes through an exit opening 116 at the lower part of the front freezer cabinet wall onto another skate conveyor 600

(FIGURE 4) aligned with and inclined in substantially the same plane as skate conveyor 514. Skate conveyor 600 is aligned with the three chain conveyors 124, 126 and 128 located in the antechamber 108 and is vertically arranged beneath the chain conveyors to convey a tray in an opposite direction from that of the chain conveyors. Adjacent the lower end of skate conveyor 600 a third skate conveyor 602 is aligned and inclined in substantially the same plane. When the tray is ejected from the magazine and freezer cabinet and passes over skate conveyor 600 onto skate conveyor 602, it will be in position directly above an elevator conveyor 130 described below in detail.

*Elevator Conveyor*

In surrounding relationship to skate conveyor 602, the frame platform 603 of an elevator conveyor 130 comprises longitudinal angle plates 604 spaced on both sides of skate conveyor 602 (FIGURE 13) the main flanges of plates 604 are disposed in the vertical plane while the horizontal flange 606 is disposed in facing arrangement to form spaced, parallel, horizontal supports. Connecting the ends of plate 604 are Z-brackets 608 and 610. The upwardly extending edge of the rear Z-bracket 608 is angled toward the rear for a purpose to become apparent. The upward extending portion of Z-bracket 610 at the front of the frame structure provides a stop plate for a tray rolling down the skate conveyor 602 (FIGURE 4). At spaced intervals along the horizontal flanges 606, small angle members 612 are suitably fixed and act as lateral tray guides when the elevator conveyor is raised to the top level position as indicated by phantom lines in FIGURE 4.

The elevator conveyor frame structure or platform 603 is guided and partially supported for vertical and horizontal shifting movement by a sliding T-shaped member 614, termed the elevator lateral and vertical stabilizer, consisting of a vertical bar 616 fixed as by welding to the mid point of a horizontal bar 618. Stabilizer bar 614 is guided, for horizontal shifting, in horizontal guide bearings 620. Fixed, as by bolts 621, to the right hand plate 604 of platform 603 is a stabilizer bar vertical guide bearing 622. Platform 603 is maintained in a horizontal position during an elevation movement to the upper level by coaction between vertical guide bearing 622 and vertical rod 616, and vertical rod 616 is allowed to shift horizontally by coaction between horizontal rod 618 and horizontal guide bearings 620.

Platform 603 is shifted and additionally supported and maintained in a horizontal position by two sets of pivoted elevator arms 624 and 626. The arms 626 are pivoted to antechamber frame 132 by trunnions 628 and are pivoted to frame side plates 604 by trunnions 630. Intermediate the ends of arms 626 and adjacent the trunnions 630, a horizontal rod 632 is welded to and rigidly joins the arms 626. In order for the pair of arms 626 to clear bearing structure within the antechamber each arm 626 is bent at point 634 and an additional horizontal support rod 636 is welded between arms 626 at this point. The front elevator arms 624 are pivoted at one end on a trunnion 638 on the antechamber frame 132 and at their other end to a trunnion 640 suitably fastened near the forward portion of platform 603. The distance between trunnions 628 and 638 is equal to the distance between trunnions 630 and 640 and the distance between trunnions 638 and 640 is equal to the distance between trunnions 628 and 630. It will thus be seen that the platform supported by trunnions 630 and 640 will remain parallel to the horizontal antechamber structure regardless of the position of elevator arms 624 and 626.

The power unit for raising and lowering the elevator conveyor 130 includes a hydraulic servo-motor 642 having its base portion pivotally mounted at 644 to a cross channel member 646 welded between two diagonal channel members 648 fixed at their ends as by welding to the antechamber frame structure 132. The piston rod 650 of servo-motor 642 is connected by clevis 652 to the mid point of horizontal rod 632. Extension and retraction of piston rod 650 will first raise the platform 603 to a position shown by dotted lines in FIGURE 4 and subsequently lower the platform to the position shown in full lines in FIGURE 4.

At spaced locations along the bend of angle plates 604 of platform 603 notches 660 are formed, corresponding in position to the spacing between pairs of latch members 188 and 189. When the platform 603 is raised to its upper position, as shown in FIGURE 5, the tray 140 will rest between guide angles 612 and between Z-brackets 608 and 610. As stated in the description of the intermittent conveyor, when platform 603 raises a tray 140 to a level above the latch members 188 and 189 the sides of the trays will engage the beveled surfaces 190 of the latch members biasing them to one side against the spring action. As the tray passes above the top level of the latches the latches are enabled to return to extended position (FIGURE 9) and this extending movement is permitted by the notches 660 in angle plates 604 (FIGURE 6). When the latches spring back to the extended position and provide a support surface for the tray 140, platform 603 may then be lowered to its original position, leaving the tray in a position to be shifted by the intermittent conveyor 124.

Servo-motor 642 is automatically actuated in the following manner. The fluid connections at the ends of the servo-motor 642 are connected through lines 662 and 664 to a solenoid operated control valve 666. The pressure supply and return lines to solenoid valve 666 are connected to a hydraulic supply system similar to that used in the magazine conveyor. The lower solenoid 668 is controlled by a circuit including limit switch 670, line 672, limit switch 674 and line 676 to direct fluid under pressure to the lower portion of servo-motor 642 and extend piston rod 650 thereby shifting platform 603 to its upper position. Upper solenoid 678 is controlled by a circuit through limit switch 680, line 679 and lines 682 to direct fluid under pressure to the upper end of servo-motor 642 to lower the platform 603 to its original position.

Operation of the elevator conveyor is initiated by receiving a tray from the exit of the magazine conveyor. As the tray passes over the skate conveyor 600 and 602 it abuts the front Z-bracket 610 and simultaneously closes limit switch 670 through control linkage 671. If there is no tray on the intermittent conveyor (FIGURE 10), limit switch 674 will be in a closed position, the circuit to solenoid 668 will be completed and the platform 603 will lift the tray and deposit it on the intermittent conveyor. As the platform reaches the top level position an actuator 681 on horizontal rod 632 will close limit switch 680 completing a circuit to solenoid 678 to lower the platform to its original position. When the tray is deposited on the intermittent conveyor and as long as it remains on the intermittent conveyor, the tray side walls engage roller actuator arms (FIGURE 9) for two limit switches 223 and 674 (FIGURE 6). Actuation of limit switch 674 (FIGURES 14 and 15) will open the circuit to solenoid 668 and lock out further raising of the elevator conveyor until the tray has cleared the intermittent conveyor.

Actuation of limit switch 223 (FIGURES 14 and 15) by a deposited tray will energize solenoid 222 through a simple conventional circuit (FIGURE 14) and allow slip clutch 216 to start driving the intermittent conveyor. Limit switch 223 is held closed by the side wall of the tray 140 so long as the tray remains on the intermittent conveyor and breaks the circuit when the tray leaves the conveyor, thereby deenergizing solenoid 222 and allowing plunger 218 to engage in notch 220, disabling the drive to the intermittent conveyor. It is thus seen that the intermittent conveyor is stopped in a position to receive another tray from the elevator conveyor and the elevator conveyor is free to be actuated through another cycle of operation as soon as a tray is received from the magazine.

Product Unloader and Exit Chute

To properly and conveniently unload units of conditioned products from the trays a novel arrangement of structure has been incorporated between the elevator conveyor 130, the intermittent conveyor 124 and the point where a tray is transferred to the indexing conveyor 126. By unloading the conditioned units just prior to refilling the trays with semi-processed units, the trays are maintained at approximately the temperature of the conditioned units, which in the case of frozen products will be at least −40° F., while the trays are in the antechamber.

With reference to FIGURES 6, 9 and 12 a tray unloading bar or plate 690 comprises a rectangular sheet metal plate bent at right angles along the top portion. The bent portion is welded to a horizontal bridge member 692 bolted to short support channel members 694 suitably affixed to the antechamber frame at a location midway between the intermittent conveyor and the indexing conveyor. Plate 690 depends into the path of movement of a tray, as it passes along the chain conveyors, and terminates just short of the plane of the tray bottoms, as indicated in FIGURE 9. The width of plate 690 is less than the distance between the side walls of a tray enabling a tray to be conveyed past the unloading plate but preventing any units of products to move with the tray to the indexing conveyor. Lateral tray guide rollers 696 depend from bridge 692 at either side of plate 690 and bear on the sides of a tray to provide additional tray guide structure.

After a tray of conditioned units has been positioned on the intermittent conveyor 124 by the elevator conveyor 130, one of the chain drive lugs 200 or 201, will engage the tray and positively push the tray past the unloading plate 690. The units will abut each other, because plate 690 prevents their passage with the tray, and drop off the open rear end of the tray as the tray moves out from under them.

Normally positioned immediately below intermittent conveyor 124 (FIGURES 4 and 9), a chute 700 receives the conditioned units as they drop from the tray passing along the intermittent conveyor and directs them out of the antechamber opening 110 to an adjoining conveyor system 702, or if desired, on a table to be packaged or further handled manually.

The space immediately below the intermittent conveyor 124 must be clear of obstructions whenever the elevator conveyor 130 is actuated to raise a tray to be positioned on the intermittent conveyor. Consequently, provision is made to tilt chute 700 to one side whenever the elevator is raised. Chute 700 is constructed of a flat bottom portion 704 extending from a point adjacent the front end of the antechamber to a point adjacent the vertical plane of unloading plate 690 and has short parallel triangular end walls 706 and converging guide walls 708 ending at an outlet opening 710. Bar braces 712 are suitably fixed to the lower surface of the chute and are rigidly fastened, adjacent the exit end of the chute, to a rod 714 as by welding. The ends of rod 714 are journalled in pillow block bearings 716 bolted to the vertical members of the antechamber frame 132 thus pivotally mounting the chute 700 so it may be tilted to a vertical position out of the path of the elevator in its upward movement.

Two bars 718 and 720 extend between the same vertical members of antechamber frame 132 that rod 714 is journalled on and provide limit stops for the tilting chute 700. Pivot rod 714 is offset from the center of gravity of the chute, as is apparent from FIGURE 9, so the chute is normally inclined against stop bar 718 to receive unloaded product units, from a tray just above.

Elevator conveyor 130 automatically tilts chute 700 to the position shown by phantom lines in FIGURE 9, during movement upwardly to the intermittent conveyor level, by a pair of rubber coated rollers 722 mounted by means of a saddle bracket 724 to the left hand elevator arm 624. As the elevator raises, arm 624 swings in an arc, indicated in FIGURE 4, and rollers 722 will engage the lower surface of center bar brace 712, moving and holding chute 700 to and in a position shown by dotted lines in FIGURE 9 against stop bar 720. Note that in the tilted position, the C.G. of the chute will remain to the right of pivot rod 714 so the chute will return of its own accord to the original position against stop bar 718 when the elevator lowers to its normal position.

Antechamber

The antechamber 108 comprises essentially a box like frame work of channel members 132 and is covered on the front, bottom and two sides by sheet metal 930. The rear end is open and adapted to abut in sealing relation with the front wall of the freezer cabinet to surround the freezer cabinet exit opening 116. On the left side of the antechamber a cover member 162, previously referred to, encloses the variable drive mechanism and a second side cover member 932 provides space for the tilting chute 700, when shifted out of the path of the elevator conveyor.

The top of the antechamber is formed of three separate covers. Cover member 934 encloses the intermitten conveyor and abuts the index mechanism cover 936. The indexing conveyor cover 106 previously described is made of Plexiglas or other similar transparent plastic to enable the deposited products to be viewed by the machine operator. Cover 106 fits over upturned flanges on bent over portions of the sheet metal sides 930, and abuts the freezer cabinet front wall 900 in surrounding relation to a portion of the cabinet entrance 112 as indicated in FIGURE 2. The remaining portion of entrance 112 is closed by an adjustable cover 940 that abuts the top of Plexiglas cover 106 to effectively seal the freezer cabinet entrance opening.

The two openings 112 and 116 leading from the freezer cabinet to the antechamber enable circulation of sub-zero air into and out of the antechamber for maintaining the antechamber at a sub-freezing temperature to effectively prevent formation of frost on the trays while they remain in the antechamber.

Should it be desired to process units having a thickness greater than the depth of a tray, the cutting mechanism pedestals 750 may be raised and an alternate higher Plexiglas cover substituted for the one disclosed. Accordingly the adjustable cabinet entrance cover 940 will also have to be raised to permit abutment of the alternate Plexiglas cover against the cabinet wall.

The antechamber covers are attached by conventional quick-disconnect fittings to provide ease of accessibility for repair and cleaning. The material used throughout the apparatus is preferably stainless steel but any suitable metal may be used.

General Operation

It has been previously mentioned that as one tray is picked up by the accelerating conveyor and inserted into the magazine entrance, the succeeding tray starts to be filled. At this point in the entire cycle of operation, the tray being filled is the only tray in the antechamber. When the magazine receives the tray, the horizontal shifting is initiated, then the vertical shifting occurs. The first stage of vertical shift will eject a tray from the magazine to the elevator conveyor. At this point, if the tray being filled has cleared the intermitten conveyor and allowed limit switch 674 to close, the elevator will automatically pass through its cycle of operation to deposit the tray on the intermittent conveyor.

As is apparent from FIGURE 4, the front end of the trays are being filled with unprocessed products before the processed items are entirely unloaded from the rear end. This feature results in the shortest possible interval between removals of units having a temperature of approximately —40° F. and depositing of the semi-solid or plastic state units, hence the tray retains a temperature approximating —40° F. or that existing in the freezing cabinet. As previously mentioned it is desirable to maintain the trays close to that temperature to prevent the freshly deposited units from freezing to the tray.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a continuous cycle, free tray, product processing machine having a system of continuous conveyors and a conditioning unit, the improvement comprising: a vertically and horizontally shiftable frame for receiving a U-shaped tray of processed products from a conditioning unit; means maintaining said frame in horizontal disposition throughout its shifting path; a straight track and chain conveyor disposed above said horizontal frame to receive trays from said frame and to convey trays toward the conditioning unit comprising two parallel vertical plates, a plurality of spring biased latch lugs disposed at substantially similar elevations and projecting horizontally from the facing surfaces of said plates, an endless chain loop vertically disposed adjacent one of said plates including at least one horizontally disposed tray driving lug, and power driving means connected to said endless chain; a fixed vertically arranged finger adapted to freely fit within the U-shaped tray as said tray moves along the tracks; a chute means disposed beneath said spaced tracks and inclined toward one side of the frame to receive products that are displaced from said tray as it moves beneath said finger, and guide them away from said mechanism; motor means connected with said horizontal frame to shift it from a lower position to a position level with said straight track conveyor and back to the lower position; and control means on said frame and said straight track conveyor connected with said motor means and actuated by trays to energize said power means; said latch lugs on said straight track conveyor enabling transfer of a tray from said frame vertically upward through and onto said straight track conveyor.

2. In a continuous cycle, free tray, product processing machine having a system of continuous conveyors and a conditioning unit, the improvement comprising: a vertically and horizontally shiftable frame for receiving a tray of processed products from a conditioning unit; means maintaining said frame in horizontal disposition throughout its shifting path; a straight track conveyor disposed above said horizontal frame to convey trays toward the conditioning unit; motor means connected with said frame to shift it from a lower position to a position level with said straight track conveyor and back to the lower position; control means on said frame and said conveyor connected with said motor means and actuated by trays to energize said motor means; latch means on said straight track conveyor enabling unidirectional transfer of a tray from said frame to said conveyor, and constituting a support means for said tray while in said conveyor.

3. The improvement set forth in claim 2, further comprising a tiltably mounted product exit chute disposed in inclined position below said track conveyor; means secured adjacent said straight track conveyor and over the path of movement of a tray while on said straight track conveyor adapted to engage with products on the tray and prevent product movement as the tray is shifted from under the products so that the products will fall off the end of the tray onto said chute; and engaging means on said frame adapted to engage said chute as said frame is shifted to its upper position to tilt said chute to a position at one side of said conveyor.

4. In a free tray conveying apparatus, a track and chain conveyor adapted to receive a tray from one conveyor and transfer the tray to another conveyor comprising: two spaced apart parallel vertical plates; a plurality of spring biased latch lugs projecting horizontally from the facing surfaces of said plates adapted to permit unidirectional vertical passage of a tray from below said latch lugs to a position above and resting on said latch lugs; an endless chain loop vertically disposed adjacent one of said plates including at least one horizontally disposed tray driving lug; and driving means connected to said endless chain.

5. In a vertical conveyor: a support; a horizontal platform; means on said support structurally cooperating with said platform to maintain said platform in a horizontal position and to permit a simultaneous horizontal and vertical shift of said platform; and reversible power means connected to shift said platform from one level to another; said cooperating means comprising a vertical track, guide means on said platform connected to and movable along said track, and frame means journalling said track on said support for horizontal movement.

6. A conveyor for vertically shifting a free element comprising: a support; a platform adapted to carry a free element; a parallelogram linkage securing said platform in horizontal disposition on said support; reversible hydraulic power means connected to said linkage for swinging said linkage to vertically shift said platform; control means connected with said power means having an actuating means on said platform adapted to be actuated by a free element placed on said platform to enable said power means to shift the platform to a different level and including further actuating means on said platform actuated by said platform upon its reaching said different level to enable said power means to shift the platform back to its initial position.

7. A conveyor as set forth in claim 6, wherein: said power means is a reversible expansible chamber type hydraulic motor; and said control means comprises a two position reversing control for said motor and electric means cooperating with said reversing control to shift it to one position or the other including a limit switch adapted to be actuated by said tray placed on said platform and a limit switch adapted to be actuated by said platform upon its reaching said different level.

References Cited in the file of this patent

UNITED STATES PATENTS

| | | |
|---|---|---|
| 1,837,605 | Baker | Dec. 22, 1931 |
| 1,850,480 | Sledge et al. | Mar. 22, 1932 |
| 2,324,531 | Nordquist | July 20, 1943 |
| 2,609,111 | Daves et al. | Sept. 2, 1952 |
| 2,621,818 | Sestilio | Dec. 16, 1952 |
| 2,625,284 | Atwood | Jan. 13, 1953 |
| 2,743,000 | Hedlund et al. | Apr. 24, 1956 |
| 2,762,489 | O'Sullivan | Sept. 11, 1956 |